United States Patent Office 3,522,032
Patented July 28, 1970

3,522,032
SELECTIVE HERBICIDAL PREPARATION
Ludwig Ebner, Stein, Aargau, and Erwin Nikles, Liestal, Switzerland, assignors to Ciba Limited, Basel, Switzerland, a Swiss company
No Drawing. Filed Sept. 6, 1967, Ser. No. 665,709
Claims priority, application Switzerland, Sept. 13, 1966, 13,210/66
Int. Cl. A01n 9/22
U.S. Cl. 71—93
2 Claims

ABSTRACT OF THE DISCLOSURE

The present invention relates to a selective herbicidal preparation, especially a preparation for combating undesired plant growth in cultures of varieties of Brassica whilst the latter remains undamaged which comprises, as the active component, the compound of the formula

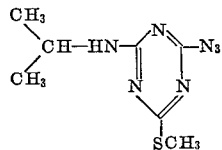

together with a suitable carrier as well as to a method for combating weeds or undesired plant growth in a crop area containing varieties of Brassica, which comprises applying to the crop area a preparation as described above.

---

The present invention provides a selective herbicidal preparation, especially a prepartion for combating undesired plant growth in cultures of varieties of Brassica whilst the latter remains undamaged which preparation comprises as the active component, the compound of the formula

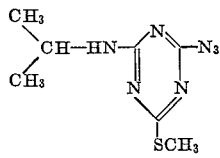

together with a suitable carrier.

The preparation may contain at least one of the following additives: a solvent, a diluent, a dispersing agent and/or an adhesive.

It has surprisingly been found that the compound of Formula I, or preparations containing this compound will combat various weeds, especially in the pre-emergence process, whilst varieties of Brassica for example rape, "Markstamm" cabbage, kohlrabi, brussels sprouts, cauliflower, cabbage, savoy, red cabbage and sunflowers remain completely undamaged.

The compound of Formula I is described in Belgian patent specification No. 656,233; it melts at 92–94° C. when recrystallized from cyclohexane. It can be easily manufactured by reacting 2,4-dichloro-6-methylmercapto-1,3,5-triazine with isopropylamine in dioxane and reacting the resulting 2- or 4-isopropylamino-6-methylmercapto-1,3,5-triazine with sodium azide.

The invention also provides a method for combating weeds or undesired plant growth in a crop area containing varieties of Brassica, which comprises applying to the crop area a preparation as defined above.

The preparations of the invention can be used in a wide variety of forms. Examples of materials for the manufacture of directly sprayable solutions of the compound of general Formula I are: mineral oil fractions within the high to medium boiling range, preferably above 100° C., for example diesel oil or kerosene, coal tar oils and oils of vegetable or animal origin, as well as hydrocarbons for example alkylated naphthalenes or tetrahydronaphthalene, optionally using xylene mixtures, cyclohexanols, ketones, and furthermore chlorinated hydrocarbons for example trichlorethane, tetrachlorethane, tetrachlorethylene or trichlorobenzenes and tetrachlorobenzenes.

Aqueous forms for application are, for example, prepared from emulsion concentrates, pastes or wettable spraying powders by adding water. Possible emulsifying or dispersing agents are, for example, non-ionic products for example condensation products of aliphatic alcohols, amines or carboxylic acids having a long-chain hydrocarbon residue containing about 10 to 20 carbon atoms with ethylene oxide, for example the condensation product of octadecyl alcohol and 25 to 30 mols of ethylene oxide or that of soja fat acid and 30 mols of ethylene oxide or that of technical oleylamine and 15 mols of ethylene oxide or that of dodecylmercaptan and 12 mols of ethylene oxide. Amongst the anionic emulsifiers which may be used, there may be mentioned: the sodium salt of dodecyl alcohol sulphuric acid ester, the sodium salt of dodecyl benzene sulphonic acid, the potassium or triethanolamine salt of oleic acid or of abietic acid or of mixtures of these acids, or the sodium salt of a petroleum sulphonic acid. As cationic dispersing agents that may be used, there may be mentioned: quaternary ammonium compounds, for example cetyl pyridinium bromide or dihydroxyethyl benzyl dodecyl ammonium chloride.

In order to manufacture dusting and scattering agents, talc, kaolin, bentonite, calcium carbonate, calcium phosphate, also charcoal, cork powder, wood flour and other materials of vegetable origin, may be used as solid carrier substances. It is also advantageous to manufacture the preparations in granulated form. The various forms of the preparations can contain the usual substances added to improve the distribution, adhesion, rain resistance or penetrating power. As such substances there may be mentioned: fatty acids, resins, glue, casein or alginates.

The following examples illustrate the invention:

EXAMPLE 1

50 g. of the active substance of Formula I are finely ground with 40 g. of Bolus alba and 5 g. of a specially finely precipitated silicon dioxide (trademark Ceosil) and 5 g. of a wetting and dispersing agent (for example a condensation product of 1 mol of p-tert.-octylphenol with 8–10 mols of ethylene oxide).

A 50% strength spraying powder, which can be dispersed in water in any desired concentrations, is thus obtained.

Of course, more highly concentrated spraying powders can also be manufactured by increasing the concentration of the active substance.

EXAMPLE 2

One field was sown with rape and thereafter treated, on the same day, with 2.0 and 2.5 kg./ha. of the active substance I according to the invention, in the form of a 50% spraying powder. Four weeks after treatment the following effect was observed:

SUMMER RAPE

| Type of treatment | Galinsoga | Stellaria | Capsella | Urtica | Total effect on weeds |
|---|---|---|---|---|---|
| Untreated | 9 | 9 | 9 | 9 | 9 |
| Compound I, 2 kg | 3 | 3 | 1 | 3 | 3 |
| Compound I, 2.5 kg | 2 | 1 | 1 | 2 | 2 |

Legend:
9=No effect.
1-3=Very good to good effect.

The rape showed normal development.

EXAMPLE 3

One field was sown with Markstamm cabbage and treated one day later with 1.5, 2.0 and 2.5 kg. of the substance I according to the invention. The following effect was observed four weeks after treatment:

| Plant | Untreated | Compound I, kg./ha. | | |
|---|---|---|---|---|
| | | 1.5 | 2.0 | 2.5 |
| Markstamm cabbage | 9 | 9 | 9 | 9 |
| Galinsoga | 9 | 2 | 2 | 2 |
| Urtica | 9 | 4 | 3 | 2 |
| Sonchus | 9 | 2 | 2 | 2 |
| Chenopodium | 9 | 2 | 2 | 1 |
| Amaranthus | 9 | 2 | 2 | 1 |
| Lamium | 9 | 3 | 2 | 2 |

Legend:
9=No effect.
1-3=Very good to good effect.

The markstamm cabbage had developed absolutely normally.

EXAMPLE 4

(Kohlarbi; brussels sprouts)

A field of kohlrabi and brussels sprouts respectively was treated, 10 days after planting out, with 1, 1.5, 2.0 and 2.5 kg./ha. of the compound I in the form of a 50% strength spraying powder. The weeds were coming up at the time of the treatment. 4 weeks after spraying, the following effect was observed:

| Plant | Untreated | Compound I, kg./ha. | | | |
|---|---|---|---|---|---|
| | | 1.0 | 1.5 | 2.0 | 2.5 |
| Kohlrabi | 9 | 9 | 9 | 9 | 9 |
| Brussels sprouts | 9 | 9 | 9 | 9 | 9 |
| Stellaria | 9 | 4 | 2 | 2 | 2 |
| Galinsoga | 9 | 2 | 2 | 1 | 1 |
| Capsella | 9 | 3 | 2 | 1 | 1 |
| Amaranthus | 9 | 3 | 3 | 3 | 2 |
| Mercurialis | 9 | 6 | 3 | 3 | 2 |
| Veronica hed | 9 | 4 | 2 | 1 | 1 |
| Chenopodium | 9 | 2 | 1 | 1 | 1 |

Legend:
9=No effect.
1-3=Very good to good effect.

What is claimed is:

1. A selective herbicidal preparation for combating undesired plant growth in cultures of varieties of Brassica whilst the latter remains undamaged which comprises as the active component, an amount of the compound of the formula

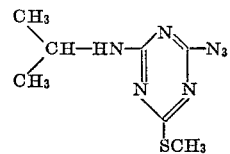

together with a suitable carrier, so as to provide 1.0 to 2.5 kg./ha.

2. A method for combating undesired plant growth in a crop area containing varieties of Brassica, which comprises applying to the crop area a preparation as claimed in claim 1.

References Cited

UNITED STATES PATENTS 3,415,827  12/1968  Nikles et al. _____ 71—93 X

JAMES O. THOMAS, JR., Primary Examiner